(12) United States Patent
Schumacher et al.

(10) Patent No.: US 12,117,599 B1
(45) Date of Patent: Oct. 15, 2024

(54) MEDICAL LIGHT

(71) Applicant: KAVO DENTAL GMBH, Biberach an der Riss (DE)

(72) Inventors: Volker Schumacher, Bad Waldsee (DE); Immanuel Ruschke, Baindt (DE); André Hackel, Biberach (DE)

(73) Assignee: KAVO DENTAL GMBH, Biberach an der Riss (DE)

( * ) Notice: Subject to any disclaimer, the term of this patent is extended or adjusted under 35 U.S.C. 154(b) by 0 days.

(21) Appl. No.: 18/695,649

(22) PCT Filed: Sep. 27, 2022

(86) PCT No.: PCT/EP2022/076753
§ 371 (c)(1),
(2) Date: Mar. 26, 2024

(87) PCT Pub. No.: WO2023/052321
PCT Pub. Date: Apr. 6, 2023

(30) Foreign Application Priority Data

Sep. 28, 2021 (EP) .................................. 21199315

(51) Int. Cl.
*F21V 33/00* (2006.01)
*G02B 19/00* (2006.01)
*F21W 131/202* (2006.01)

(52) U.S. Cl.
CPC ..... *G02B 19/0061* (2013.01); *G02B 19/0028* (2013.01); *F21V 33/0068* (2013.01); *F21W 2131/202* (2013.01)

(58) Field of Classification Search
CPC ............ G02B 19/0061; G02B 19/0028; G02B 19/0047; G02B 19/0004; F21V 5/00;
(Continued)

(56) References Cited

U.S. PATENT DOCUMENTS 5,128,848 A * 7/1992 Enders .................... F21S 8/043
362/299
7,648,256 B2 * 1/2010 Shiratsuchi ............. F21V 5/008
362/268
(Continued)

FOREIGN PATENT DOCUMENTS

EP 0391287 A1 10/1990
EP 2469159 A2 6/2012

OTHER PUBLICATIONS

International Search Report and Written Opinion for Application No. PCT/EP2022/076753 dated Dec. 15, 2022 (13 pages with translation).

*Primary Examiner* — Bao Q Truong
(74) *Attorney, Agent, or Firm* — Michael Best & Friedrich LLP (57) ABSTRACT

A medical light (100) has an illumination unit (10) having lighting means (20) and optical means (30) for generating a light field (200), wherein the lighting means (20) are formed by an essentially punctiform LED light source (21) and the optical means (30) have a plate-shaped collimator (40) and a cover pane (50). The collimator (40) has a central area (42), which is provided with light-refracting structures (43) on a side facing away from the LED light source (21), and an outer area (46), which is provided with structures (48) designed for total reflection on a side facing toward the LED light source (21), wherein the cover pane (50) is provided with a lens structure, which has a plurality of individual lenses which each project the light emitted by the collimator (40) onto the object plane. The rear side of the central area of the collimator facing toward the LED light source is provided with partial surfaces (45, 145), which have an inclination in relation to a plane (E3) of the collimator (40), in order to asymmetrically expand the light field (200) in one direction.

16 Claims, 8 Drawing Sheets

(58) Field of Classification Search
CPC . F21V 5/002; F21V 5/004; F21V 5/04; F21V 5/08; F21V 33/0068; F21W 2131/20; F21W 2131/202
See application file for complete search history.

(56) References Cited

U.S. PATENT DOCUMENTS

| | | |
|---|---|---|
| 2007/0147041 A1 | 7/2007 | Shiratsuchi et al. |
| 2008/0239697 A1* | 10/2008 | Katsuda ............... A61B 1/0607 362/33 |
| 2018/0112848 A1* | 4/2018 | Streppel ............. G02B 27/0905 |

* cited by examiner

MEDICAL LIGHT

BACKGROUND OF THE INVENTION

The present invention relates to a medical light, in particular a dental treatment light, with the aid of which the intraoral illumination of an operation field is performed.

To ensure the quality of medical treatments, it is indispensable for the examination or treatment point to be adequately illuminated. Medical treatment lights are accordingly designed for the purpose of illuminating the point to be examined or treated using an optimized light field, which assists the examination and/or treatment.

In the case of dental lights, the properties of this light field are defined by different standards. One of these is EN ISO 9680, according to which, for example, the color rendering index (CRI) is greater than 85, a minimum illuminance of 15000 Lux is present, and the light field has a color temperature between 3600 and 6400 Kelvin. In addition, to avoid irritation or even eye damage to the patient, it is provided that the light field drops off sufficiently strongly in edge areas, so that a strictly bounded space around the treatment point is illuminated in the object plane.

A light which meets the above-mentioned requirements is known, for example, from EP 2 469 159 B1 of the applicant. This light has multiple light units each having a separate light source and a separate optical unit. The light of the light source of a light unit, which is implemented with the aid of multiple LEDs, is influenced via the optical unit such that a predetermined, generally approximately hexagonal area is illuminated at a specific distance in front of the light, in the so-called object plane. The multiple light units of this known light are now constructed and positioned so that they all jointly illuminate the corresponding area in the object plane, so that a homogeneously illuminated light field results overall. If the light of a single light unit is shaded in this case, for example, by an arm of a physician or in another way, the illumination of the light field is still performed as before by the further, non-shaded light units. In this way, it is ensured that substantially shade-free illumination of the area to be examined is achieved.

The above-described known light has proven itself repeatedly in practice. However, the production of this light is associated with comparatively complex assembly of the individual components, since an exact alignment of the individual light units in relation to one another is necessary to achieve a homogeneously illuminated light field. Deviations therefrom would have the result that brightness or color changes occur in the edge area of the light field, which are undesired.

A further problem is that the alignment of the individual light units matched to one another has the result that the corresponding beam bundles are exactly superimposed only at a fixedly defined distance from the light. The desired homogeneous illumination of the light field is thus primarily obtained in a specific plane in front of the light. In contrast, if there is a deviation from this ideal distance, the quality of the light field drops off.

In general, placing the light at a fixed predefined distance from the area to be examined is actually provided. However, this is not always possible and it would accordingly be desirable if the quality of the light field were less strongly dependent on the distance of the light from the area to be illuminated.

Furthermore, a light for general illumination purposes is known from US 2007/0147041 A1, in which the light of a light source is used for uniform illumination of a light field. In this case, the optical system used consists of a plate-shaped collimator and a plate arranged downstream of the collimator, which is provided with lens-type structures, by which a comparatively simpler structure is achieved as a whole, with the aid of which a symmetrically illuminated light field is achieved.

As mentioned at the outset, the light field is to be comparatively strictly bounded in order to avoid, for example, blinding a patient to be examined. This means that illumination is actually only to take place within a specific, predetermined area; in contrast, the surrounding area is not to be illuminated. However, it has been shown that excessive brightness differences can have a fatiguing effect on an observer, since the adaptation function of the human eye is excessively strained in this way.

SUMMARY OF THE INVENTION

The present invention is based on the object of providing a medical light which is optimized with regard to the above-mentioned aspects.

The object is achieved by a medical light, in particular a dental treatment light, which has the features of claim 1. Advantageous refinements of the invention are the subject matter of the dependent claims.

One essential difference of the light according to the invention in relation to the solution known from EP 2 469 159 B1 is that the light now has a single illumination unit having a single, essentially punctiform LED light source. In this case, this can be a single LED or a compact LED cluster. However, multiple illumination units are not provided, which would then have to be complexly assembled and aligned matched to one another as explained above, in order to achieve efficient and uniform illumination of a light field. Instead, the light emitted by the single punctiform LED light source is influenced with the aid of optical means in a particular manner to achieve homogeneous and uniform illumination of a light field, which is then less strongly dependent on the distance of the area to be illuminated from the light, however. The optical means have a collimator and a cover pane in this case, wherein both components are provided in a specific manner with light-guiding structures and components in order to enable an optimized illumination of the light field with a compact structure despite everything.

Furthermore, deviating from the solution of EP 2 469 159 B1 or also US 2007/0147041 A1, it is provided that the brightness gradients in the edge area of the light field, which otherwise is to be homogeneously illuminated as already mentioned, are additionally to be influenced. For this purpose, the optical means are constructed in such a way that the light field is asymmetrically expanded in one direction.

According to the present invention, a medical, in particular a dental treatment light for the intraoral illumination of an operation field is thus proposed, which has an illumination unit having lighting means and optical means for generating a light field in an object plane. The lighting means are formed in this case by an essentially punctiform LED light source and the optical means have a plate-shaped collimator and a cover pane, wherein the collimator has a central area, which is provided with light-refracting structures on a side facing away from the LED light source, and an outer area, which surrounds the central area and which is provided with structures designed for total reflection on a side facing toward the LED light source, and wherein the cover pane is provided with a lens structure, which has a plurality of individual lenses each designed to project the light emitted by the collimator and entering the lenses onto the object plane.

The rear side of the central area of the collimator facing toward the LED light source is provided here with partial surfaces, which have an inclination in relation to a plane of the collimator and thus in relation to the object plane, in order to asymmetrically expand the light field in one direction.

Both components of the optical system are thus designed in a special manner in order to influence the light emitted by the LED light source in an optimized manner. The design of the collimator according to the invention takes into consideration in this case that the special composition of the light emitted by a white light LED light source is dependent on the angle at which the light is emitted. It is a known phenomenon of white light LEDs that light which is emitted essentially perpendicular to the surface of the LED generally has a higher color temperature, thus a slight bluish component, whereas strongly laterally emitted light has a lower color temperature and accordingly appears slightly yellowish. The design of the collimator according to the invention takes this effect into consideration and ensures the formation of, on the one hand, a central light field, which is to be attributed to the light emitted essentially perpendicular from the LED light source, and, on the other hand, an outer light field, which is formed by the light emitted laterally from the LED light source. It is ultimately ensured by a corresponding superposition of central and outer light fields, which is achieved by the design of the cover pane, that the final light field is actually uniformly homogeneously illuminated and color changes or color temperature changes do not occur in the edge area. At the same time, the use of a single light source in combination with the optical system designed according to the invention ensures that the uniform illumination of the light field is less strongly dependent on the distance to the light, and so the above-described problems known in the prior art are avoided.

The asymmetrical expansion of the light field according to the invention furthermore has the result that, for example, the brightness gradient at the upper and lower edge of the light field is influenced, wherein the brightness drop in the edge area is less strongly pronounced in particular in the lower area and accordingly less strong brightness contrasts occur than in the opposite edge area. Undesired blinding of a patient at the upper edge area of the light field is thus avoided, since a sharp delimitation of the illuminated area in relation to the surroundings is present here. At the same time, excessively strong contrasts are avoided in the opposite edge area, by which appearances of fatigue are reduced for an observer, for example, for the attending physician.

The asymmetrical expansion of the light field is thus obtained in that the rear side of the central area of the collimator facing toward the LED light source is provided with partial surfaces which have an inclination in comparison to the plan of the collimator and thus the object plane.

In particular, it can be provided that at least some of the partial surfaces, preferably all of them, are each tilted around an axis which lies in the plane (E3) of the collimator (40) and is essentially perpendicular to the direction of the asymmetrical expansion. An alternative or additional option for achieving the asymmetrical expansion of the light field can furthermore be that at least some of the lenses forming the lens structure are tilted with respect to the plane of the collimator around an axis which is aligned essentially perpendicular to the direction of the asymmetrical expansion.

It is preferably provided that the partial surfaces are formed by strip-shaped surface areas, which each extend essentially perpendicular to the direction of the asymmetrical expansion along their respective tilt axis. It can furthermore be provided here that the strip-shaped surface areas are concavely curved with respect to the direction of the asymmetrical expansion, wherein the strip-shaped surface areas are each particularly preferably formed symmetrically with respect to a plane, which is perpendicular to the plane of the collimator and is spanned by an axis extending parallel to the direction of the asymmetrical expansion. This measure has the result that viewed in the width, a certain expansion of the light field is achieved, which is now symmetrical, however.

Alternatively to the strip-shaped partial surfaces, it would also be conceivable that the partial surfaces are tile-shaped partial surfaces, which cover the rear side of the central area of the collimator facing toward the LED light source like a matrix. Analogously to the above-mentioned concave design of the tile-shaped partial surfaces, it can then be provided here that at least some of the tile-shaped partial surfaces are tilted with respect to the plane of the collimator around an axis extending parallel to the direction of the asymmetrical expansion, wherein in particular the majority of the tile-shaped partial surfaces are arranged symmetrically with respect to a plane which is perpendicular to the plane of the collimator and is spanned by an axis extending parallel to the direction of the asymmetrical expansion. This measure in turn has the result that viewed in the width, a certain expansion of the light field is achieved.

The light-refracting structures of the central area of the collimator preferably form a so-called Fresnel structure. Furthermore, it is preferably provided that the structures of the collimator designed for total reflection form a further Fresnel structure facing toward the LED light source, which encloses the central area like a ring in a projection perpendicular to the plane of the collimator. This design of the structures of the collimator makes it possible to design it like a pane in principle and nonetheless to efficiently influence the light of the LED light source. In this way, a compact construction of the entire illumination unit is enabled. The light-refracting structures of the central area and the structures of the outer area of the collimator designed for total reflection can preferably have a common rotational symmetry in this case. It is preferably provided that these structures form aspheric surface areas.

The lenses of the cover pane also used according to the invention are preferably arranged on a side of the cover pane facing toward the LED light source. In particular, for the case that the cover pane forms an outer surface of the light, it can be provided that the side of the cover pane facing away from the LED light source is constructed as smooth. This prevents in particular an accumulation of dirt particles on the surface of the light and thus facilitates its cleaning.

Analogously to the collimator, the lens structure of the cover pane can also have an inner area and an outer area, wherein lenses of the inner area are designed to project the light emitted by the central area of the collimator in the form of a central light field on the object plane, lenses of the outer area are designed to project the light emitted by the outer area of the collimator in the form of an outer light field on the object plane, and wherein central light field and outer light field are preferably essentially completely superimposed. In particular, it can be provided in this case that each individual lens of the inner or outer area completely projects the corresponding central or outer light field, respectively. This measure in turn has the result that for the case that a part of the light emitted via the cover pane of the light is shaded, for example, by an arm or the head of the attending physician, nonetheless complete and still essentially homogeneous illumination of the desired area is achieved.

The lenses of the inner area can be essentially square in this case, whereas the lenses of the outer area have a greater extension in the direction of an axis of the collimator, which extends perpendicular to the direction of the asymmetrical expansion, than in an axis extending parallel to the direction of the asymmetrical expansion.

Ultimately, a light is thus provided with the aid of the present invention, which enables optimized illumination of a treatment area, wherein, however, the light-emitting unit of the light has comparatively few components, which results in simplified production and assembly of the light overall. In particular, however, the advantage is obtained that the quality of the illumination of the light field is less strongly dependent on the distance to the light.

BRIEF DESCRIPTION OF THE DRAWINGS

The invention is to be explained in more detail hereinafter on the basis of the appended drawings. In the figures.

DETAILED DESCRIPTION

Figure 1:
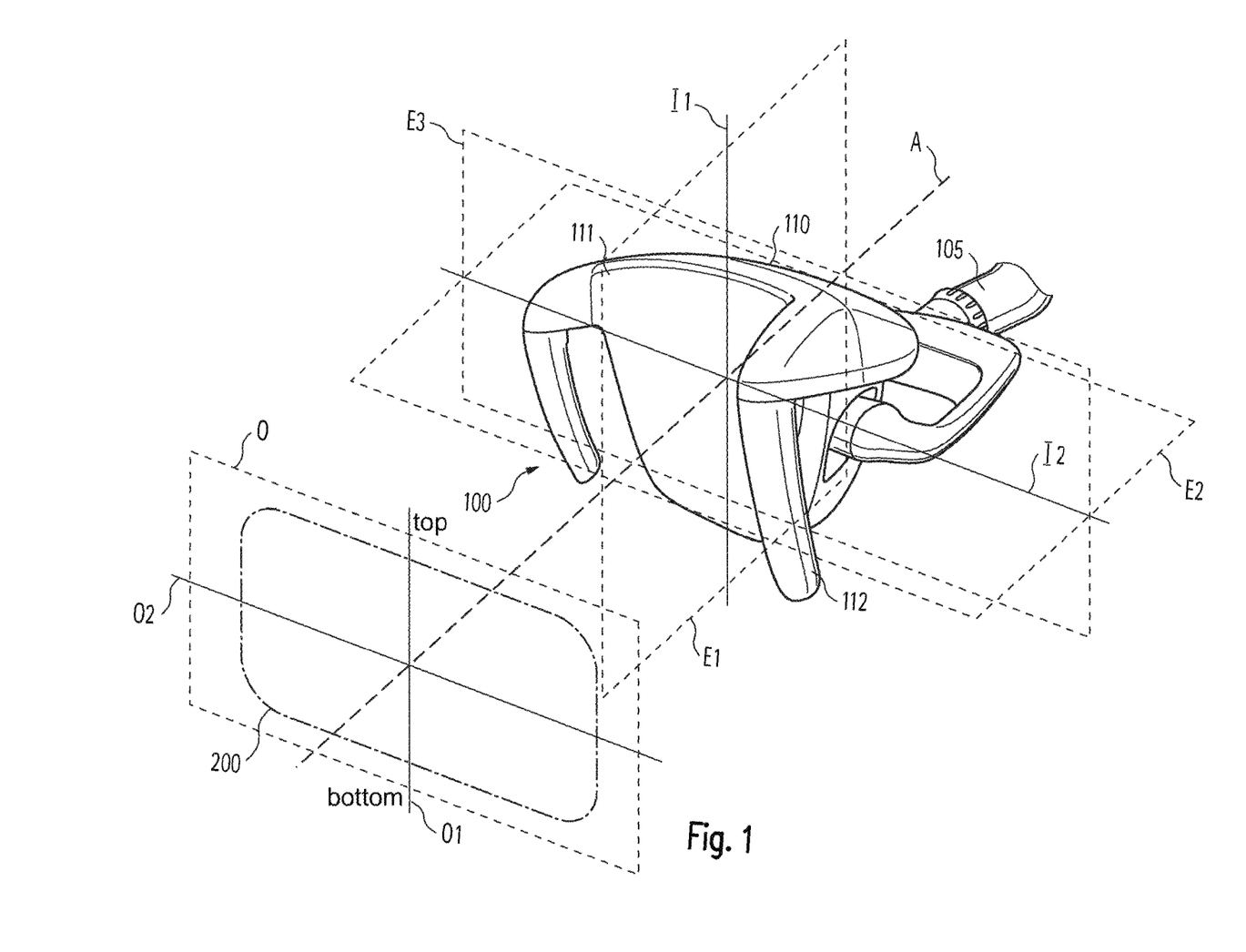
FIG. 1 shows a perspective view of a medical light, in which the illumination unit designed according to the invention is used.

FIG. 1 shows a perspective view of a medical light, provided in general with the reference sign 100, in particular a dental treatment light, with the aid of which the operation field of a dental workspace is to be illuminated. The light 100 is designed in this case according to the invention, thus equipped with the illumination unit described hereinafter in detail; however, the external form of the light may of course also be designed differently. The illustration in FIG. 1 is primarily used in this case to illustrate the planes and directions to which reference is made in the later explanation of the optical components of the illumination unit according to the invention.

In principle, the light 100 has a light head 110, which is arranged adjustably on an articulated arm 105 (not shown in greater detail) such that it can be aligned in a desired manner on the operation area. The housing 111 of the light head 110 has two lateral handles 112 in this case for its adjustability, by which a manual alignment of the light 100 is enabled.

In the illustration according to FIG. 1, it is presumed that the alignment of the light head 110 is such that light is directed essentially horizontally along an axis A, which corresponds to the main axis of the optical system of the light 100, onto an area located in front of the light 100. In this illustration, the plane E2 shown in FIG. 1 is aligned horizontally, and the plane E1 is shown perpendicular thereto and extending through the main axis of the optical system A. The two axes I1 and I2 extending in the planes E1 and E2 and the optical axis A are then each perpendicular to one another. As already mentioned, of course, the light head 110 can also be pivoted during use such that the plane E2 is not aligned horizontally, but rather extends diagonally downward or inclined. This will be the case in particular if the light 100 is located above a patient located in a recumbent position. However, it is presumed for the following explanation that the plane E2 is aligned horizontally.

Figure 2:
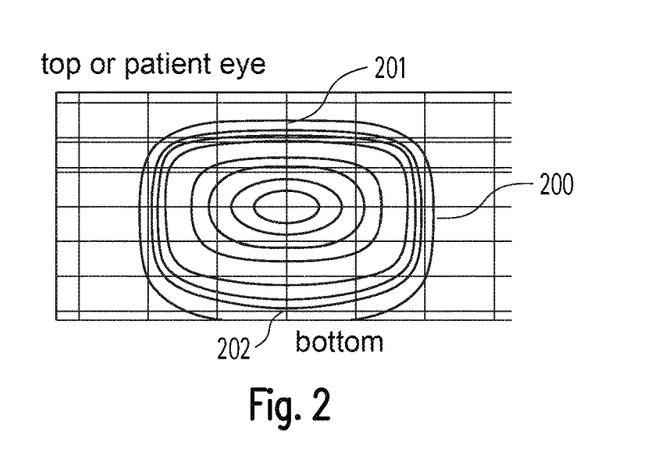
FIG. 2 schematically shows the light field achievable with the aid of the light according to the invention.
Figure 3:
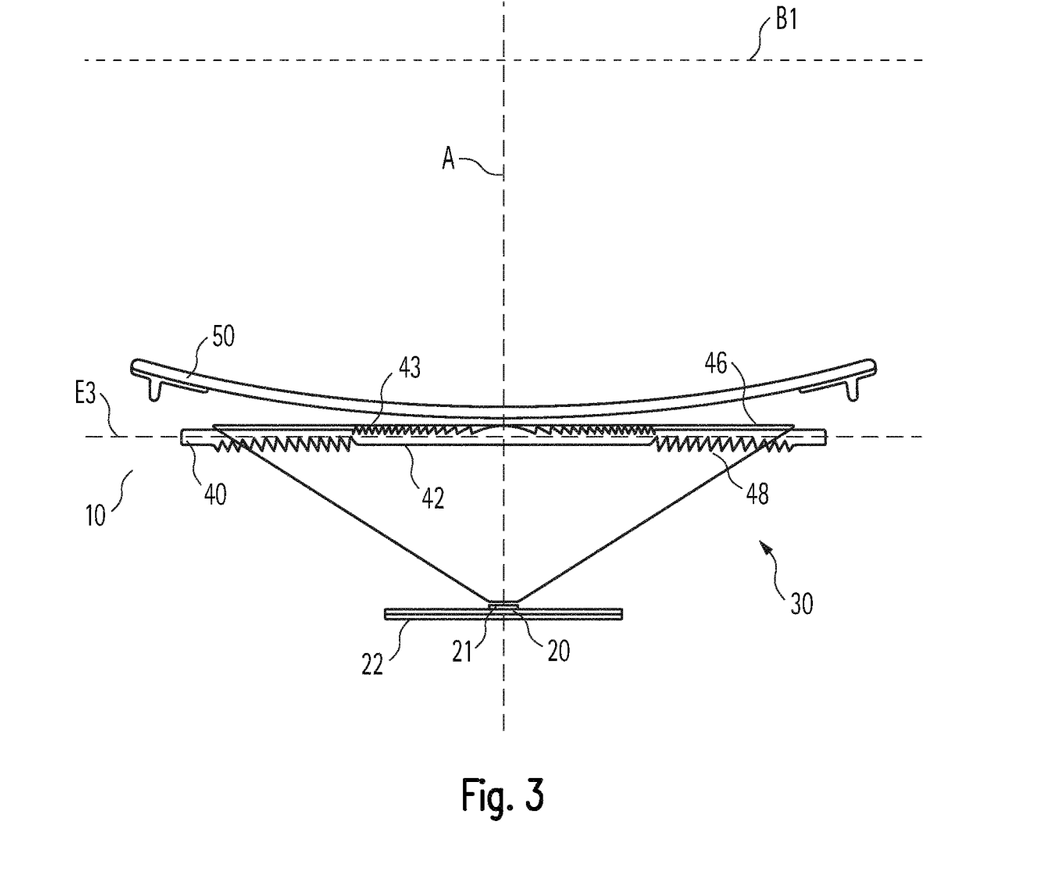
FIG. 3 shows an illustration of the various components of the illumination unit according to a first exemplary embodiment.
Figure 4:
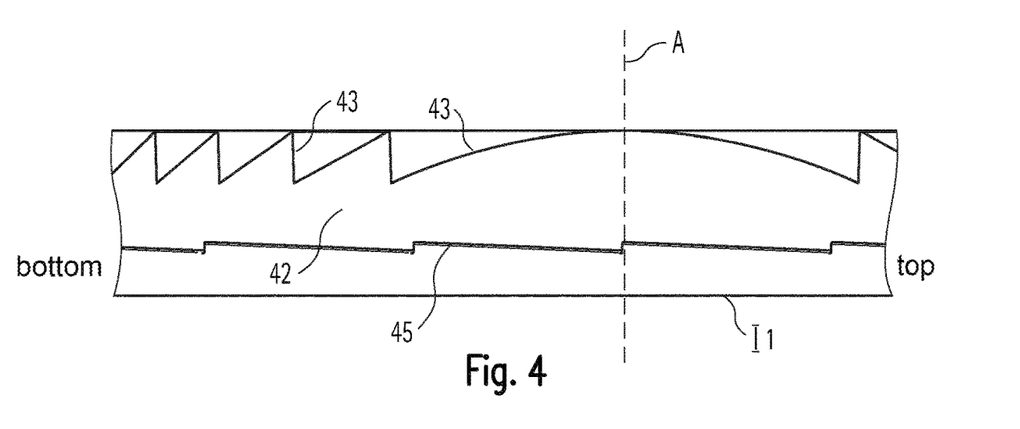
FIG. 4 shows an enlarged view of a partial area of the collimator from FIG. 3.
Figure 5:
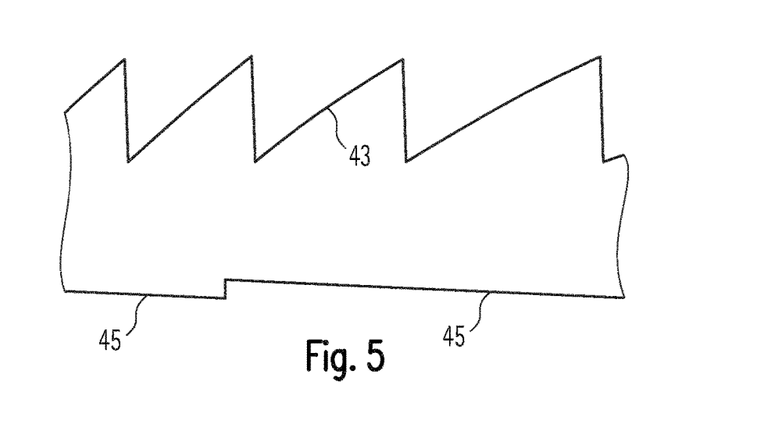
FIG. 5 shows a further illustration, enlarged once again, of a partial area of the collimator.

With the aid of the light 100 according to the invention, a light field 200, which is schematically shown in FIGS. 1 and 2, is thus to be achieved in a specific area in front of the light 100 in the so-called object plane O (see FIGS. 1 and 3). The object plane O is aligned in this case parallel to the plane E3 of the collimator described in more detail hereinafter and thus jointly therewith perpendicular to the optical axis A, and it is to be noted that the distance between the plane E3 of the collimator E3 and the object plane O and thus the distance between the light 100 and the light field 200 will be greater in reality than is shown in the figures. As already mentioned above, it is presumed in the following explanations of the design of the optical components of the light 100 that the optical axis A extends horizontally and accordingly the object plane O and the plane E3 are aligned vertically. Depending on the alignment of the light head 110 during the actual use of the light 100, however, if necessary the optical axis A will also have an inclination or in the extreme case will even point vertically downward, which then also results in a corresponding change of the alignment of the various planes.

In this case, the light field 200 has a slightly rounded, but essentially rectangular shape, wherein the light field 200 extends farther in the horizontal direction—along the axis O2—than in the vertical direction along the axis O1. One special feature according to the invention in this case is that—as is explained in more detail hereinafter—due to the special design of the optical means, the light emission of the light 100 is slightly expanded asymmetrically in one direction—in the illustrated example in the vertical direction. As indicated by the lines in FIG. 2 schematically showing the light field 200, this means that in its upper edge area 201, the light field 200 is strongly delimited in relation to the surroundings, thus a high brightness gradient is present here at the transition from the light field 200 to the non-illuminated surroundings. This strong delimitation is used, as already mentioned, to avoid blinding a patient to be examined, which plays an essential role in particular in dental examinations or treatments. In contrast, at the opposite lower side 202, the light emission is preferably slightly expanded, so that lesser brightness gradients are present here. The light field 200 thus runs out more softly toward the lower side, by which the proportion of high brightness contrasts is reduced in the overall field of view, for example, of a physician. Since such strong brightness contrasts require an ultimately fatiguing adaptation of the human eye, this measure has the result that more pleasant work is enabled for the dentist. Notwithstanding these edge areas, however, it is provided that the light field 200 is to be illuminated as homogeneously and uniformly as possible over its entire extension, wherein this is to take place essentially independently of the distance to the light 100. This effect is achieved with the aid of the design according to the invention of the illumination unit, as is to be explained in more detail hereinafter.

The optical structure of the illumination unit 10 provided in the interior of the light 100 according to a first embodiment is shown in FIG. 3. Essential components are primarily the lighting means 20 in the form of a punctiform LED light source 21, which are arranged on a corresponding circuit board 22. The LED lighting means 21 form an essentially punctiform individual light source. It is thus either a single high-performance LED or a comparatively compactly designed LED cluster consisting of multiple LEDs. In both cases, the LED light source 21 is designed such that it emits white light having a desired color temperature.

The optical system 30, which influences the light emitted by the lighting means 20 in a comparatively broad angle range, consists of two components, on the one hand, a collimator 40 and, on the other hand, a cover pane 50 downstream of the collimator 40—viewed in the light emission direction. This pane is constructed slightly curved, in particular slightly concavely curved in the illustrated exemplary embodiment, but could also be of a planar or other design. Both collimator 40 and cover pane 50 consist of a light-transmissive material, in particular a plastic material, which has good light-influencing properties and is resistant to external influences, in particular to moisture and the like.

It is provided according to the invention that the collimator 40 is formed by a one-piece, essentially plate-shaped component, which defines the above-mentioned plane E3, and is divided into two areas. A first, light-refracting area 42 is provided in this case in the geometric center of the collimator 40 and has light-refracting structures 43 on the side facing away from the LED light source 21. The task of this central area 42 is to convert the corresponding beam bundle into a central light field, which is then emitted via the cover 50.

An outer area 46 is provided framing the central area 42, in which the light is deflected by means of total reflection. The corresponding structures 48 are located in this case on the side facing toward the LED light source 21 and generate a second outer light field, which is also emitted via the cover 50. The ultimately desired uniform light field 200 is then achieved by a superposition of the central and the outer light field, wherein this superposition is achieved by an expansion structure described in more detail hereinafter, which is located on the side of the cover pane 50 facing toward the LED light source 21. As a result of a substantially expanded uniformly illuminating surface being implemented as a light source by the lighting means 20 and the associated components 40 and 50 of the optical system 30, the effect of defocusing of the target light field upon leaving the optimum imaging distance is advantageously achieved. In other words, the optical system 30 is constructed in principle in such a way that an exact superposition between the central and outer light field is achieved at a predetermined distance of, for example, 700 mm and accordingly the target light field is illuminated particularly uniformly and homogeneously. However, if this ideal distance is rejected, the change resulting in this case with respect to the uniform illumination is less strongly pronounced than in the case of the lights in the prior art. An optimal homogeneous illumination of the light field 200 can essentially still be achieved in a range between 500 and 800 mm distance.

Figure 6:
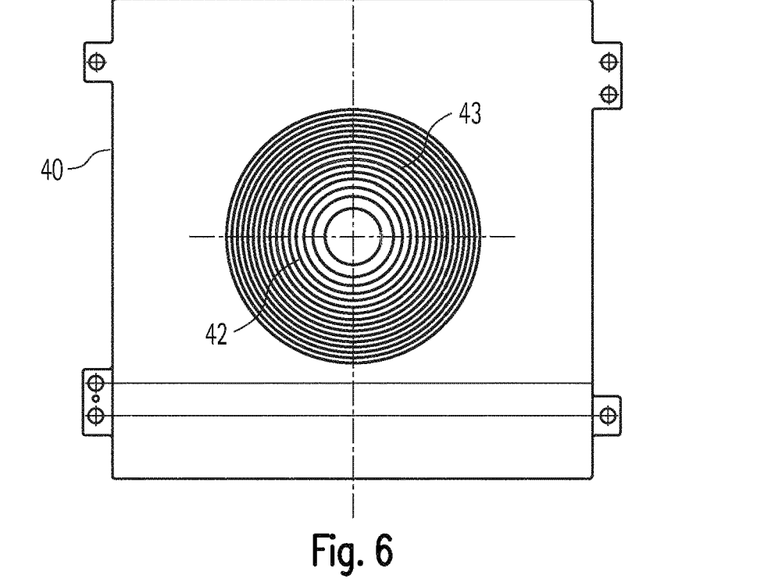
FIG. 6 shows the front side of the collimator facing away from the LED light source.
Figure 7:
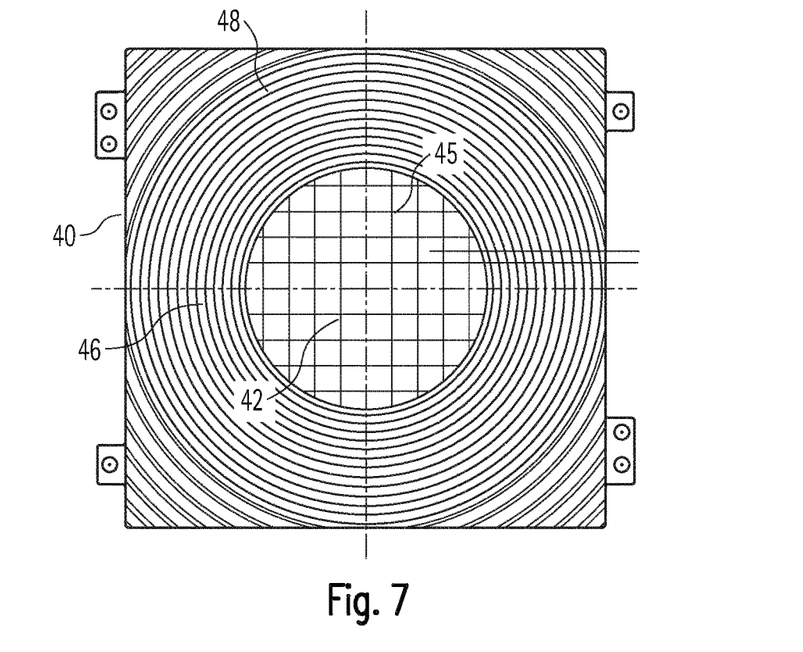
FIG. 7 shows the rear side of the collimator facing toward the LED light source.

The design of the collimator 40 can be seen in FIGS. 4 to 7. As already mentioned, it is an essentially plate-shaped plastic component which—as FIGS. 6 and 7 show—has an essentially square shape and is used to convert the beam bundle of the LED light source 21 emitted over a large angle range into an essentially parallel beam bundle. For this purpose, the surfaces of the collimator 40 have specific light-influencing structures, which are to be explained in more detail hereinafter.

A Fresnel-type structure 43 is thus initially provided in a central area 42 on the side of the collimator 40 facing away from the LED light source 21, which is to deflect the light beams leaving the collimator 40 by means of light refraction such that they are aligned essentially parallel to the optical main axis A of the system. Such Fresnel structures are already known per se and contribute to being able to reduce the thickness of the corresponding optical component in comparison to a classic convex lens. Ultimately, extremely efficient bundling of the corresponding light can be achieved with the aid of the sawtooth-type structure visible in particular in FIGS. 4 and 5, which—as is visible in FIG. 6—has a rotational symmetry around the center or the axis A.

The collimator 40 furthermore has an outer area 46, which is again provided with Fresnel-type structures 48, surrounding the central area 42 like a ring, but now on the side facing toward the lighting means 20. These are also made rotationally symmetrical with respect to the optical main axis A, corresponding to the illustration of FIG. 7, and are used to influence the more laterally emitted light beams such that they are again aligned in parallel to the optical axis A. However, while the Fresnel structures 43 of the central area 42 influence the light beams by means of refraction, the light beams are influenced by means of total reflection by the Fresnel structures 48 of the outer area 46. This means that these sawtooth-like structures again are constructed in such a way that light beams can initially enter the ribbed projections, but are totally reflected due to the difference of the optical density between collimator 40 and surrounding air such that they leave the collimator 40 again on the side facing away from the lighting means 20. It is again ensured by the corresponding inclination of the flanks of the total-reflecting structures 48 that an alignment of the light parallel to the optical axis A of the system takes place.

The light influenced in this way by the collimator 40 is then projected by the cover pane 50 on the actual light field 200, wherein this has a lens structure described in more detail hereinafter for this purpose, which ultimately causes central light field and outer light field to be superimposed in order to achieve a homogeneous uniform illumination.

The cooperation of these components consisting of the compactly designed LED light source 20, the collimator 40 having the light-refracting and total-reflecting structures, and the cover pane 50 initially has the result that the ultimately achieved light field 200 has a large brightness gradient in the edge area, thus is strongly delimited in relation to the surroundings. This is desirable in particular at its upper side, thus in the direction of the eye of a patient to be examined, in order to avoid blinding here. In contrast, at the opposite side, a significantly more fuzzy delimitation of the light field 200 is to be present, as already mentioned, in order to achieve a reduction of occurrences of fatigue of the person performing treatment. This means that the light field 200 is ideally to have an asymmetry in one direction having a soft fade toward the lower side.

To achieve this effect, additional structuring is provided on the rear side opposite to the light-refracting structures 43 of the central area 42, thus on the side of the collimator 40 facing toward the lighting means 20. This structuring consists in the first exemplary embodiment shown in FIGS. 3 to 7 of segment-like individual tiles 45 which—as is visible in FIG. 7—fill up the entire central area 42 up to the outer structure 46 like a matrix. These facet-like tiles 45 now have a slight inclination or tilt in order to be able to achieve the above-mentioned one-sided expansion of the light field. In particular, for this purpose the tiles 45 are tilted around the horizontal axis (or in general around an axis which lies in the plane of the collimator 40 and is essentially perpendicular to the direction of the asymmetrical expansion), i.e., they enclose a small angle in the case shown with the vertical axis I1 or O1 (see FIG. 4), so that light beam bundles entering the collimator 40 are expanded slightly toward the lower side. Even a minor inclination of the tiles 45, as is visible in FIGS. 4 and 5, already has the result here that the lower edge area of the light field 200 has a somewhat reduced brightness gradient.

Alternatively or additionally to the above-described tilt of the tiles 45 around an axis perpendicular to the direction of the asymmetrical expansion, it would also be conceivable to tilt the lens structure on the cover pane 50 in a corresponding manner in order to generate the desired advantageous effect of the asymmetrical light field distribution. This will be explained in more detail later on.

In addition, however, the tiles 45 can also be tilted in the vertical axis I1 or O1 (or in general around an axis which extends parallel to the direction of the asymmetrical expansion of the light field), wherein they are then preferably arranged symmetrically with respect to the plane E1, which is perpendicular to the plane E3 of the collimator 40 and is spanned by an axis I1 extending parallel to the direction of the asymmetrical expansion. The horizontal extension of the central light field 200 is influenced in this way, which ultimately additionally contributes to the homogeneous illumination of the light field 200.

This further tilt of the tiles 45 around a vertical axis (or around an axis extending parallel to the direction of the asymmetrical expansion) and the symmetrical design with respect to the vertical plane E1 results overall in an approximately concave-type design of the surface of the rear side of the central area 42 of the collimator 40 facing toward the lighting means 20. The effect resulting therefrom of the slightly even more homogeneous illumination of the light field 200 can now also be achieved, however, in that the individual tiles lying at the same height are unified to form a larger surface, which then also has a corresponding curvature or bulge. A corresponding exemplary embodiment thereof is shown in FIGS. 8 to 13 and is to be explained hereinafter, wherein comparable elements were provided with identical reference signs.

The optical system of the light 100 according to the invention therefore also consists of the plate-shaped collimator 40 and the cover pane 50 having the lens structure downstream of the collimator 40 in this second exemplary embodiment. The collimator 40 again has a central area 42, which is provided on its side facing away from the LED light source 21 with light-refracting structures 43, wherein furthermore an outer area 46 surrounding the central area 42 is provided, which is provided on a side facing toward the LED light source 21 with structures 48 designed for total reflection. Both the structures 43 of the central area 42 and the structures 48 of the ring-like outer area 46 correspond in this case with regard to their design and their function to the structures of the exemplary embodiment of FIGS. 3 and 7. Therefore, no differences from the first exemplary embodiment result with respect to these features.

The decisive difference between the first exemplary embodiment of FIGS. 3 to 7 and the second exemplary embodiment of FIGS. 8 to 13 is the design of the rear side of the collimator 40 opposite to the light-refracting structures 43 of the central area 42, which is covered in the first exemplary embodiment with the above-mentioned tiles 45 like a matrix.

In the second exemplary embodiment, partial surfaces 145 are again provided, which are now provided, however, in the form of strip-shaped surface areas 145, which each extend horizontally (or in general perpendicularly to the direction of the asymmetrical expansion) from the left end of the central area 42 to the right end with an alignment of the light corresponding to FIG. 1. These strip-shaped surface areas 145 are again arranged such that they preferably completely cover the rear side of the central area 42.

Analogously to the tiles 45, the essential function of the strip-shaped partial surfaces 145 here is primarily to achieve the asymmetrical expansion of the light field 200 according to the invention such that a lesser brightness contrast occurs on the lower side or the side of the light field 200 opposite to the patient eye than at the opposite edge area. The strip-shaped partial surfaces 145 are also in this case each tilted around an axis for this purpose which lies in the plane E3 of the collimator 40 and is essentially perpendicular to the direction of the asymmetrical expansion of the light field 200. The corresponding sectional view of FIG. 9, which corresponds to the illustration of FIG. 4 of the first exemplary embodiment, thus shows a comparable inclination of the partial surfaces 145, by which the light beams are influenced in an analogous manner as was explained above in conjunction with FIGS. 3 to 7. The sawtooth-type structure of the corresponding surface area of the collimator 40 resulting therefrom as a whole can also be seen in the two perspective views in partial section of FIGS. 10 and 11.

Figure 11:
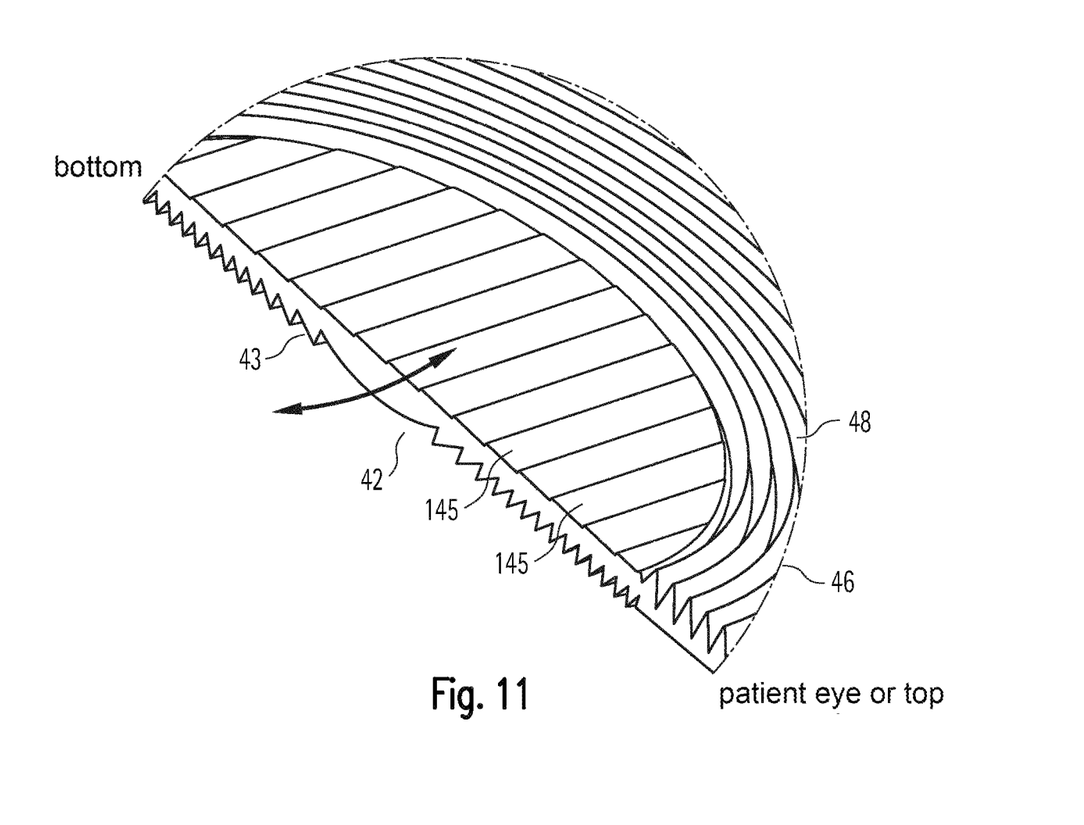
Figure 12:
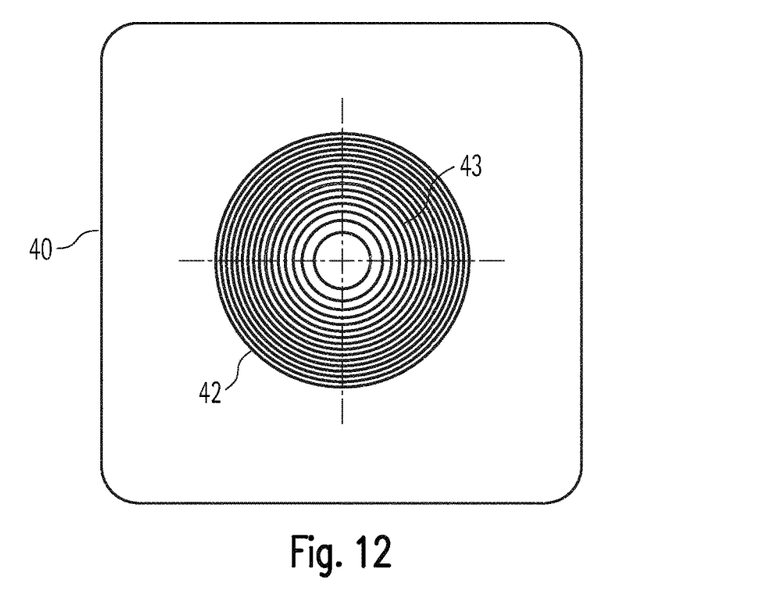
FIG. 12 shows the front side of the collimator, facing away from the LED light source, according to the second exemplary embodiment.
Figure 13:
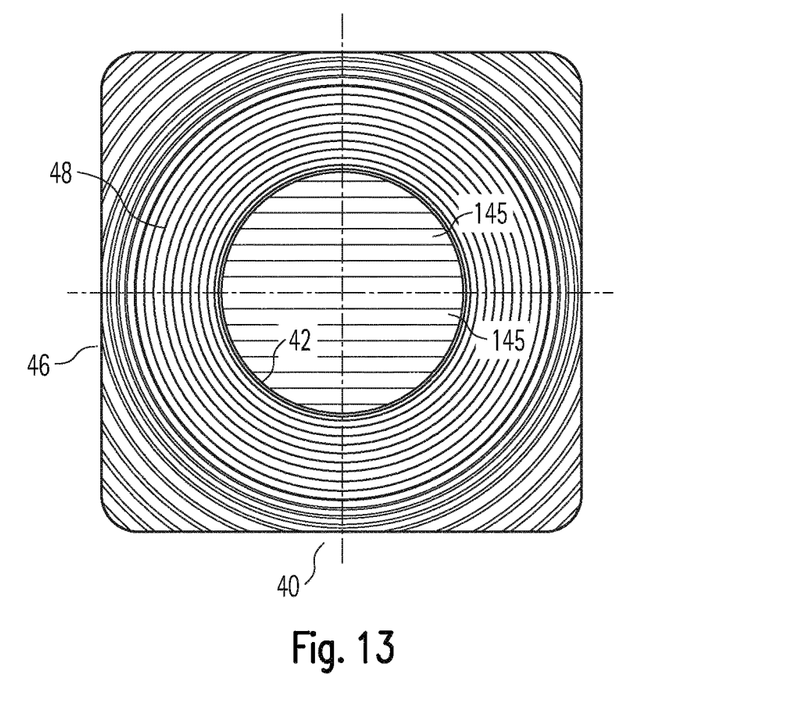
FIG. 13 shows the rear side of the collimator, facing toward the LED light source, according to the second exemplary embodiment.
Figure 14:
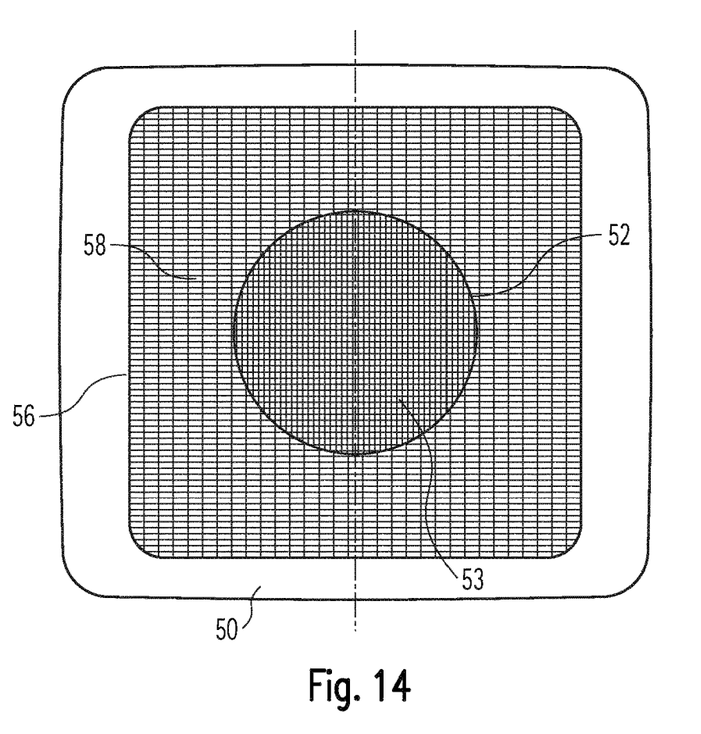
FIG. 14 shows a view of the cover pane provided with the lens structure.

It is additionally provided that the strip-shaped surface areas 145 are concavely curved with respect to the direction of the asymmetrical expansion of the light field 200, wherein the direction of the curvature is schematically shown by the double arrow greatly exaggerated in FIG. 11. The concave design of the strip-shaped surface areas 145 is again preferably such that a symmetrical configuration results here with respect to the plane E1, which is perpendicular to the plane E3 of the collimator 40 and is spanned by an axis I1 extending parallel to the direction of the asymmetrical expansion. In the sectional view of FIG. 9, the rear end areas of the strip-shaped surface areas 145 are each visible due to this concave curvature.

The surface design of the rear side of the central area 42 of the collimator 40 resulting in this case overall corresponds to that of the exemplary embodiment of FIGS. 3 to 7, wherein the individual tiles lying at the same height have now been replaced by continuously and steadily extending service areas 145, however.

In comparison to the first exemplary embodiment of FIGS. 3 to 7, the second exemplary embodiment of FIGS. 8 to 13 represents the preferred embodiment here, since now the edges at the transitions of two adjacent tiles 45 have been illuminated. Such edges are fundamentally accompanied by the risk of undesired, uncontrollable light scattering, so that a somewhat better control of the light by the collimator 40 can once again be achieved by the design of the surface corresponding to the second exemplary embodiment.

The above-described measures take into consideration the circumstance that the spectrum of the light emitted by the LED light source 21 is dependent on the emission angle. In particular, the light emitted in the center or centrally is colder and becomes warmer with increasing emission angle radially outward, which is to be attributed to the increasing pass length of the blue light emitted by the LED chip through the corresponding color conversion material, for example, through the phosphorus. The light of the central light field and that of the outer light field will thus initially have a different color or color temperature. Overall, a homogeneous illumination is achieved, however, as a result of ultimately a superposition of both light fields being achieved with the aid of the cover 50. The fact that the light-refracting structures 43 of the central collimation structure and the surfaces 48 of the outer collimation structure 46 are constructed as aspheric surfaces also contributes to the deliberate thorough mixing of the light field or to obtaining a color-homogeneous light field. Their shape is dependent here on the distance from the center of the optical axis A of the collimator 40; however, both structures have a rotational symmetry overall, as is visible in the figures.

The light beams influenced in this way by the collimator 40 are then finally influenced by the cover pane 50, wherein this is constructed in the same manner for both exemplary embodiments of the collimator 40. As already mentioned, the cover pane 50 can be constructed as slightly concave or also planar and has a lens structure on its side facing toward the LED light source 21. In contrast, the side facing away from the lighting means is preferably made unstructured, thus smooth, and accordingly enables easy cleaning, which is advantageous in particular if the cover 50 forms the outer side of the light 100 at the same time.

Figure 8:
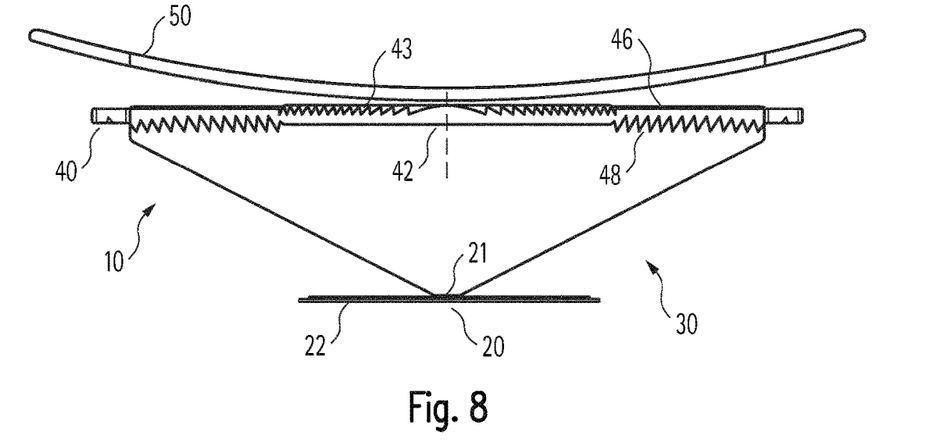
FIG. 8 shows an illustration of the various components of the illumination unit according to a second exemplary embodiment.
Figure 9:
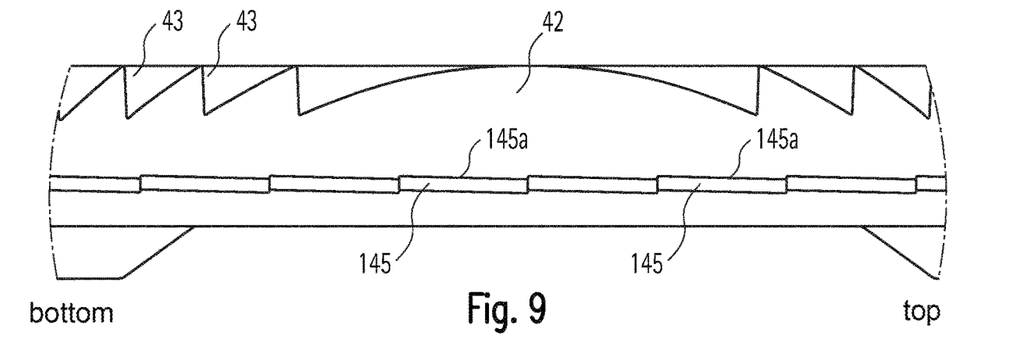
FIG. 9 shows an enlarged view of a partial area of the collimator from FIG. 8.
Figure 10:
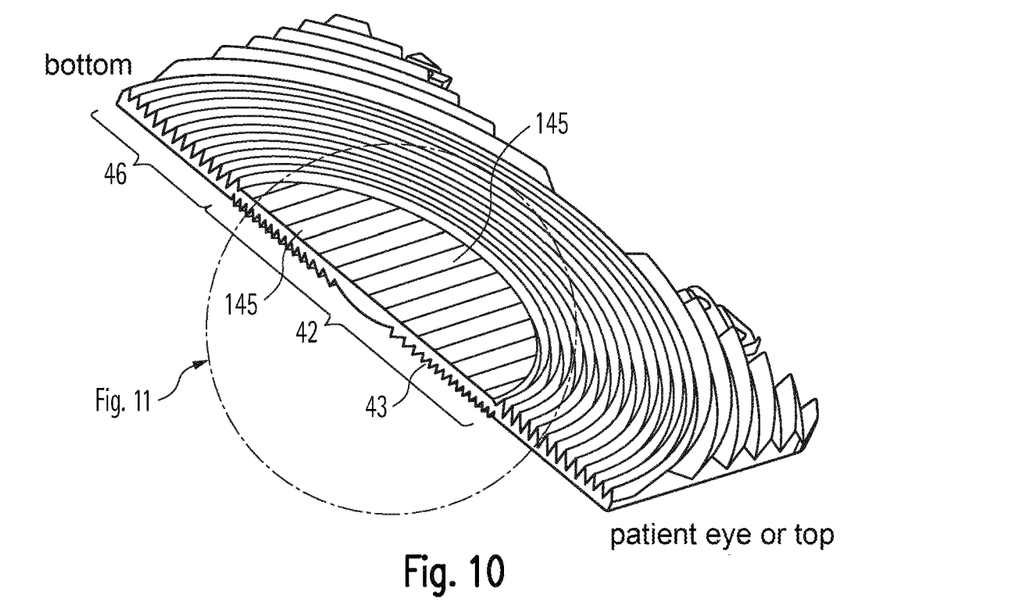
FIGS. 10 and 11 show further sectional views of the collimator according to the second exemplary embodiment.

Like the collimator 40, the lens structure of the cover pane 50 is also embodied in two parts. As indicated in FIG. 8, a first central area 52 having associated first lenses 53 and an outer area 56 having associated second lenses 58 is again provided in this case. Both areas of the lens structure correspond in this case to the two areas of the collimator 40. In other words, light beams influenced by the central area 42 of the collimator 40 are to be influenced by the central lens area 52 of the cover, whereas the light emitted via the outer area 46 of the collimator 40 is influenced by the outer lens structure.

However, both lens structures 52 and 56 are each constructed as a microlens array and are used to project the corresponding light partial beam bundles onto the area to be illuminated as the expansion structure. The ratio of height to width of the individual lenses in this case defines the value of the horizontal and vertical expansion of the light field 200, wherein these values are slightly different for the central lenses 43 and outer lenses 58, thus both light fields are expanded slightly differently. These measures then ultimately have the result that central light field and outer light field are essentially completely superimposed within the distance of approximately 500 to 800 mm provided for illumination and thus an overall homogeneously illuminated light field 200 is obtained.

Each individual lens of the cover pane 50 projects the complete central or outer light field in this case, so that the shading of individual lenses or parts of the cover pane 50 does not result in shadows in the light field 200. This also contributes to optimized illumination. In the illustrated exemplary embodiment, the lenses of the outer area have a different size and shape in comparison to the lenses of the central area. In particular, the lenses 53 of the central area 52 are constructed as approximately square, whereas the lenses 58 of the outer area have more of a rectangular shape. However, this does not necessarily have to be the case. It is only decisive that the expansion of the individual beam bundles by the lenses takes place such that overall complete superposition occurs, which results in uniform illumination substantially independently of the distance to the light. As a result, a homogeneous target light field results which has the desired properties.

In order to achieve the above-explained asymmetrical light field distribution, it is conceivable that alternatively or additionally to the inclination of the tiles 45 or the strip-shaped partial surfaces 145, a part of the lens structures 52 and/or the lens structures 56 or all lenses 53, 58 are tilted with respect to the plane E3 of the collimator around an axis which is aligned essentially perpendicular to the direction of the asymmetrical expansion. This measure also results in the advantageous asymmetrical expansion of the light field 200 at its lower side 202, so that the corresponding inclined alignment of the tiles 45 or strip-shaped partial surfaces 145 could optionally also be omitted.

Overall, a high-quality illumination of an area to be examined or treated can thus be achieved with the aid of the light according to the invention. The light is also distinguished here by its comparatively simple structure, which only contains a few individual components and is significantly less critical in comparison to known solutions with respect to exact alignment and positioning of the individual components in relation to one another.

The invention claimed is:

1. A medical light, in particular a dental treatment light for the intraoral illumination of an operation field, having an illumination unit having lighting means and optical means for generating a light field in an object plane,
   wherein the lighting means are formed by an essentially punctiform LED light source and the optical means have a plate-shaped collimator and a cover pane,
   wherein the collimator has a central area, which is provided with light-refracting structures on a side facing away from the LED light source, and an outer area, which surrounds the central area and which is provided with structures designed for total reflection on a side facing toward the LED light source,
   and wherein the cover pane is provided with a lens structure, which has a plurality of individual lenses each designed to project the light emitted by the collimator and entering the lenses onto the object plane,
   characterized in that
   the rear side of the central area of the collimator facing toward the LED light source is provided with partial surfaces, which have an inclination in relation to a plane of the collimator and thus in relation to the object plane, in order to asymmetrically expand the light field in one direction.

2. The medical light as claimed in claim 1,
   characterized in that
   at least some of the partial surfaces, preferably all of them, are each tilted around an axis which lies in the plane of the collimator and is essentially perpendicular to the direction of the asymmetrical expansion.

3. The medical light as claimed in claim 2,
   characterized in that
   the partial surfaces are formed strip-shaped and each extend essentially perpendicular to the direction of the asymmetrical expansion along their respective tilt axis.

4. The medical light as claimed in claim 3, characterized in that
the strip-shaped surface areas are concavely curved with respect to the direction of the asymmetrical expansion,
wherein the strip-shaped surface areas are preferably each formed symmetrically with respect to a plane, which is perpendicular to the plan of the collimator and is spanned by an axis extending parallel to the direction of the asymmetrical expansion.

5. The medical light as claimed in claim 2, characterized in that
the partial surfaces are tile-shaped and cover the rear side of the central area of the collimator facing toward the LED light source like a matrix.

6. The medical light as claimed in claim 5, characterized in that
at least some of the tile-shaped partial surfaces are tilted with respect to the plane of the collimator around an axis which extends parallel to the direction of the asymmetrical expansion.

7. The medical light as claimed in claim 6, characterized in that
the majority of the tile-shaped partial surfaces are arranged symmetrically with respect to a plane, which is perpendicular to the plane of the collimator and is spanned by an axis extending parallel to the direction of the asymmetrical expansion.

8. The medical light as claimed in claim 1, characterized in that
the light-refracting structures of the central area of the collimator form a Fresnel structure.

9. The medical light as claimed in claim 8, characterized in that
the structures of the collimator designed for total reflection form a further Fresnel structure facing toward the LED light source, which preferably encloses the central area-like a ring in a projection perpendicular to the plane of the collimator.

10. The medical light as claimed in claim 9, characterized in that
the light-refracting structures and the structures of the collimator designed for total reflection have a common rotational symmetry.

11. The medical light as claimed in claim 10, characterized in that
the light-refracting structures and the structures of the collimator designed for total reflection have aspheric surface areas.

12. The medical light as claimed in claim 1, characterized in that
the optical means are constructed such that the light field, which is projected perpendicular to the optical axis of the light on the object plane, has a greater expansion along an axis extending perpendicular to the direction of the asymmetrical expansion then along an axis extending parallel to the direction of the asymmetrical expansion.

13. The medical light as claimed in claim 1, characterized in that
at least some of the lenses forming the lens structure are tilted with respect to the plane of the collimator around an axis which is aligned essentially perpendicular to the direction of the asymmetrical expansion.

14. The medical light as claimed in claim 1, characterized in that
the lenses are arranged on a side of the cover pane facing toward the LED light source, wherein preferably the side of the cover pane facing away from the LED light source is formed smooth, in particular forms a smooth outer surface of the light.

15. The medical light as claimed in claim 1, characterized in that
the lens structure of the cover pane has an inner area and an outer area, wherein
lenses of the inner area are designed to project the light emitted by the central area of the collimator in the form of a central light field on the object plane and
lenses of the outer area are designed to project the light emitted by the outer area of the collimator in the form of an outer light field on the object plane,
and wherein central light field and outer light field are essentially completely superimposed, wherein preferably each individual lens of the inner or outer area completely projects the corresponding central or outer light field, respectively.

16. The medical light as claimed in claim 15, characterized in that
the lenses of the inner area are essentially square and the lenses of the outer area have a greater extension in the direction of an axis of the collimator, which extends perpendicular to the direction of the asymmetrical expansion, than in an axis of the collimator extending parallel to the direction of the asymmetrical expansion.

* * * * *